United States Patent
Palvoelgyi et al.

[11] Patent Number: 6,076,695
[45] Date of Patent: Jun. 20, 2000

[54] CLOSURE CAP WITH ACOUSTICAL TORQUE WARNING DEVICE

[75] Inventors: Sandor Palvoelgyi, Gleisdorf; Stefan Feichtinger, Anger, both of Austria

[73] Assignee: Tesma Motoren-und Getriebetechnik Ges.m.b.H.

[21] Appl. No.: 09/243,388

[22] Filed: Feb. 1, 1999

[30] Foreign Application Priority Data

Jan. 30, 1998 [AT] Austria ............ 153/98

[51] Int. Cl.$^7$ .................. B65D 25/28
[52] U.S. Cl. ............ 220/212.5; 220/293; 220/DIG. 32; 220/DIG. 33
[58] Field of Search .................. 220/212.5, 288, 220/293, 301, 302, DIG. 32, DIG. 33

[56] References Cited

U.S. PATENT DOCUMENTS

| | | | |
|---|---|---|---|
| 3,715,075 | 2/1973 | Blau et al. | |
| 3,815,776 | 6/1974 | MacMillan. | |
| 3,986,634 | 10/1976 | Smith et al. | |
| 4,809,869 | 3/1989 | Cosgrove et al. | 220/288 |
| 5,110,003 | 5/1992 | MacWilliams | 220/304 |
| 5,279,439 | 1/1994 | Kasugai et al. | 220/203 |
| 5,638,975 | 6/1997 | Harris | 220/288 |
| 5,732,841 | 3/1998 | Jocic et al. | 220/203.24 |
| 5,924,590 | 7/1999 | Jocic et al. | 220/203.24 |

FOREIGN PATENT DOCUMENTS

| | | |
|---|---|---|
| 1910471 | of 0000 | Germany. |
| 2239007 | of 0000 | United Kingdom. |

*Primary Examiner*—Stephen K. Cronin
*Attorney, Agent, or Firm*—Bachmna & LaPointe, P.C.

[57] ABSTRACT

Closure cap for the acoustical indication of a predetermined torque being exceeded during securing, having a closure part which can be secured in a sealing manner on the opening; a gripping part for applying the torque; a rotational connection between the closure part and gripping part, which connection permits relative rotation between said two parts; springs which act between the closure part and gripping part in the direction of the relative rotation and subject the extent of the relative rotation to the torque applied; and at least one arrangement comprising a resilient tongue and a snap-in bead, one part of the arrangement being arranged the gripping part and the other part being arranged on the closure part, and at one point during the relative rotation the tongue, by being temporarily deflected, passing the snap-in bead.

8 Claims, 3 Drawing Sheets

CLOSURE CAP WITH ACOUSTICAL TORQUE WARNING DEVICE

BACKGROUND OF THE INVENTION

The present invention relates to a closure cap which can be secured in a sealing manner on an opening, for example a filler neck, by means of a rotational movement, for the acoustical indication of a predetermined torque being exceeded during securing, having a closure part which can be secured in a sealing manner on the opening, and a gripping part for applying the torque.

When screwing on or screwing in a closure cap having, for example, a screw-type or quarter-turn fastener it is frequently desirable to obtain information on whether a predetermined limiting torque has been reached or exceeded. Although known ratchet mechanisms effectively limit the torque, they are not very ergonomic since "turning" of the ratchet mechanism awkwardly stresses the user's wrist.

The object of the invention is to provide a rotary closure cap having an acoustical indication of a torque being exceeded, which cap is of simple design.

SUMMARY OF THE INVENTION

The foregoing object is achieved by means of a closure cap of the type mentioned above which is distinguished by a rotational connection between the closure part and gripping part, which connection permits relative rotation between said two parts; spring means which act between the closure part and gripping part in the direction of the relative rotation and subject the extent of the relative rotation to the torque applied; and at least one arrangement comprising a resilient tongue and a snap-in bead, one part of the arrangement being arranged on the gripping part and the other part being arranged on the closure part, and at a point during the relative rotation the tongue, by being temporarily deflected, passing the snap-in bead.

In this manner, as the torque increases—which results in an increasing relative angle of rotation—the tongue slides on to the bead, is deflected and tensioned and as it passes the summit the bead suddenly springs back, which causes an audible noise. "Turning" as in the case of known ratchet mechanisms is prevented by the increasing counterforce of the spring means, which prevents the user's wrist from being overstressed when screwing on or screwing in the closure cap and thus decisively increases the ergonomy. Moreover, the solution according to the invention is substantially more simple to produce than the known ratchet designs.

It is particularly advantageous if there is additionally provided a stop which is arranged on the gripping part or closure part and against which the tongue strikes after passing the snap-in bead. This substantially increases the noise of the tongue springing back.

A preferred embodiment of the invention is distinguished by the spring means being formed by a compression spring which is arranged in the gripping part diametrically between two moveable tabs which slide during the relative rotation on radially inwardly leading ramps of the closure part. This makes possible a particularly compact design.

The ramps are preferably provided with end stops. This limits the relative rotation between the closure part and gripping part to an angular range predetermined by the end stops; the end stop in the "screw-on direction" (increasing torque) prevents further relative rotation between the closure part and gripping part once the tongue has passed the snap-in bead and has therefore indicated the torque being exceeded. The end stop in the other direction can expediently be reached even in the inoperative position of the spring means, since in this direction ("unscrewing direction") an indication of torque is not required.

In each case it is particularly favorable if the rotational connection is formed by a sliding fit between a circumferential skirt of the gripping part and a circumferential edge of the closure part, which edge is overlapped by said skirt. As a result, the rotational connection is transferred to the outer circumferential region, and the central region of the closure cap can be entirely used for the above-mentioned spring and tongue mechanism, which makes a more compact design possible.

The closure part preferably has a basket which can be inserted into the opening and is intended to hold a valve capsule or the like, and a driving ring which can be secured on the basket edge and fastens the valve capsule in place. This embodiment is particularly suitable for closing the vehicle tank filler neck in which a valve capsule having a pressure-relief and suction-relief valve has to be arranged in the closure cap. In this case, it is particularly advantageous if the snap-in bead, the stop and the ramps are formed on the upper side of the driving ring, and the tongue is formed on the lower side of the gripping part. A driving ring of this type can be formed by simple punching and drawing processes.

BRIEF DESCRIPTION OF THE DRAWINGS

The invention is explained in more detail below with reference to an exemplary embodiment illustrated in the drawings wherein.

DETAILED DESCRIPTION

Figure 1:
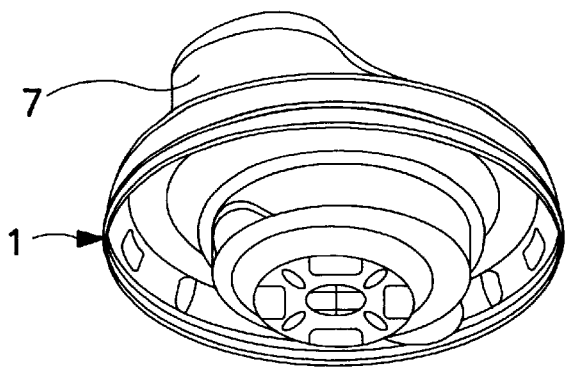
FIG. 1 shows the closure cap from below in perspective.
Figure 2:
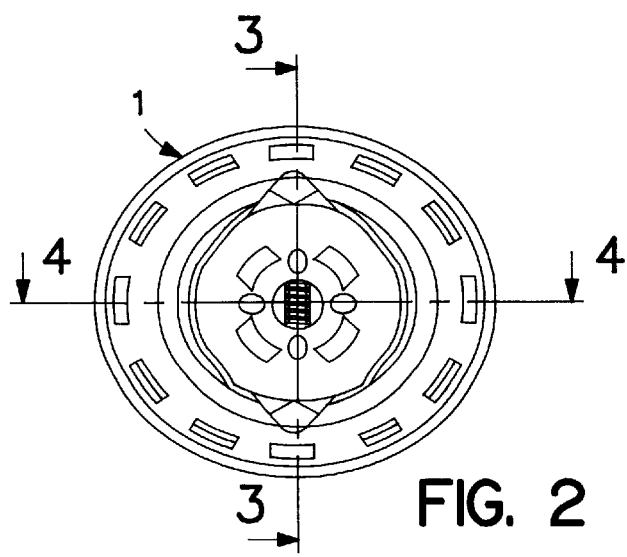
FIG. 2 shows the closure cap in a bottom view.
Figure 3:
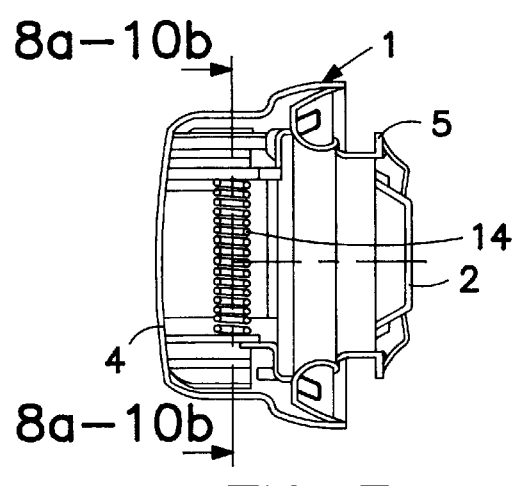
FIGS. 3 and 4 are sectional views along the lines A—A and B—B, respectively, of FIG. 2.
Figure 4:
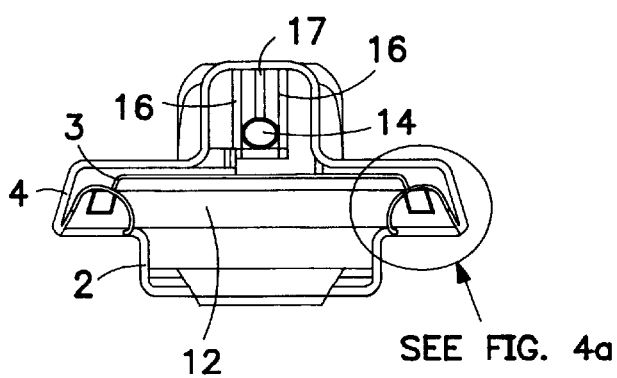
Figure 4A:
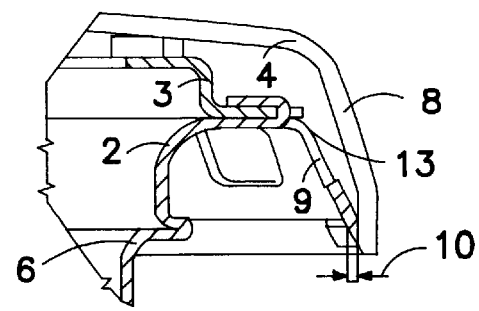
FIG. 4a shows an enlarged detail E from FIG. 4.
Figure 5:
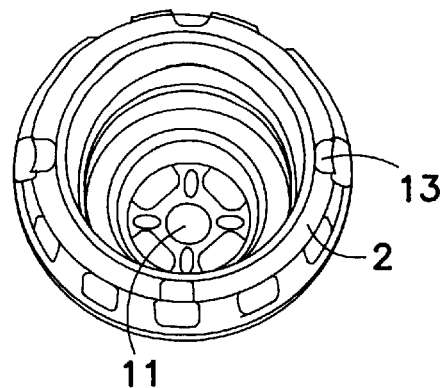
FIGS. 5 to 7 show the three essential subassemblies of the closure cap, specifically, the basket of the closure part, the driving ring of the closure part and the gripping part of the closure part in perspective views from above in FIGS. 5, 6 and from below in FIG. 7.

With reference to FIGS. 1 to 7, the closure cap 1 is composed of three main subassemblies, specifically, a basket 2, a driving ring 3 and a gripping part 4. The basket 2 and the driving ring 3 together form a closure part which is inserted in a sealing manner into the opening to be closed (not shown), for example, into the entrance of a filler neck. For this purpose, the outer circumference of the basket 2 is fitted with tabs 5 which are distributed over the circumference and can be inserted, by means of a rotational movement of the closure part, into corresponding threaded grooves or quarter-turn slots in the entrance region of the opening to be closed (not shown). To form a seal between the closure part and opening (not shown), a corresponding annular seal can be placed in between, which seal is, for example pulled onto the closure part at 6 or is provided on the internal circumference of the opening to be closed or on the end side of the neck end which is to be closed.

The gripping part 4, the upper side of which is fitted with a corresponding grip 7 or the like, is used to apply the corresponding torque to the closure part 2, 3. The gripping part 4 has a circumferential skirt 8 which overlaps a circumferential edge 9 of the basket 2 with a clearance 10, with the result that a sliding fit or rotational connection respectively is produced between the gripping part 4 and closure part 2, 3, the purpose of which will be explained.

The base of the basket 2 is provided with perforations 11 and in its interior forms a holding space 12 to hold a capsule valve (not shown), for example a pressure-relief and suction-relief valve, as is used in closure caps for fuel tank filler necks. The driving ring 3, which rests on the upper edge of the basket 2, protrudes over the holding space 12 and fastens the capsule valve (not shown) contained therein in place. The driving ring 3 is secured on the upper side of the basket 2 with the aid of flanged tabs 13 and is thus connected to said basket in a rotationally fixed manner.

The rotational connection (at 10) formed between the closure part 2, 3 and gripping part 4 is limited as a function of torque by means of a spring mechanism described below. In the gripping part 4, more precisely in the grip 7, a compression spring 14 is arranged diametrically between two spring-loaded tabs 15 and presses the latter radially outward. To facilitate assembly the spring 14 is partially overlapped by laterally bearing latching tongues 16 and bears against a supporting rib 17 (FIG. 4) so that it is fixed in position in the gripping part 4 before the gripping part 4 and closure part 2, 3 are put together.

Figure 6:
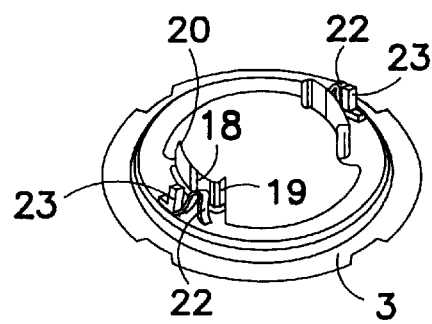
Figure 7:
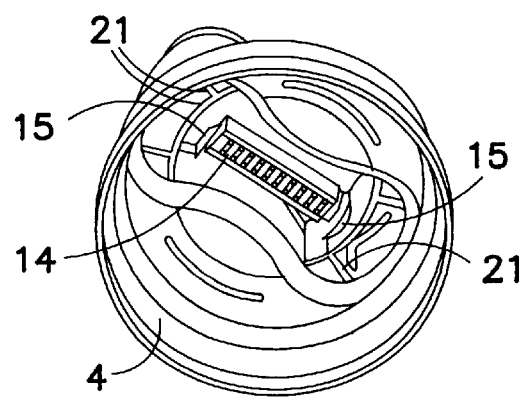
Figure 8B:
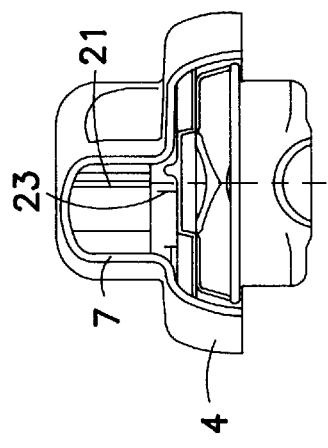
FIGS. 8a, b to 10a, b, respectively, show a sectional view along the line C—C from FIG. 3(a) and a sectional view along the line D—D (b) in three different operating positions, specifically in the inoperative position (8a, b), the deflection position of the tongue shortly before it passes the snap-in bead (9a, b) and the stop position of the tongue after it has passed the snap-in bead (10a, b).
Figure 9B:
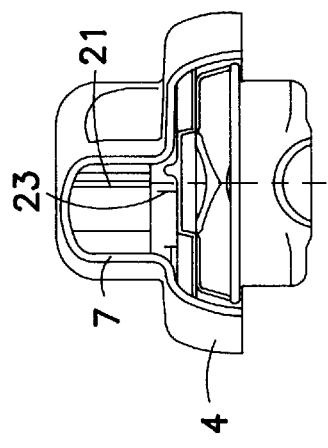
Figure 10B:
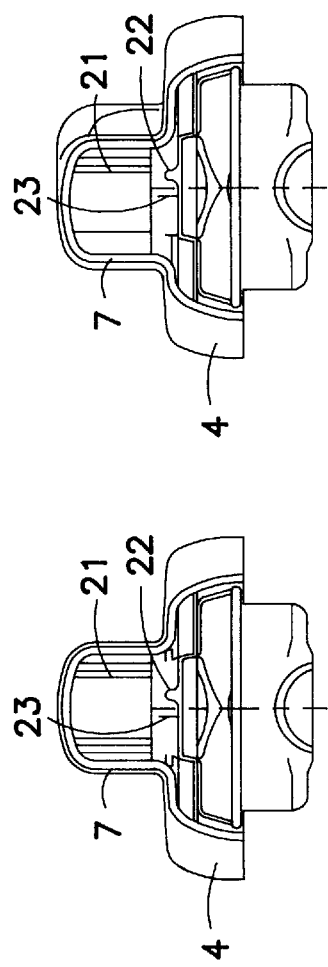
Figure 8A:
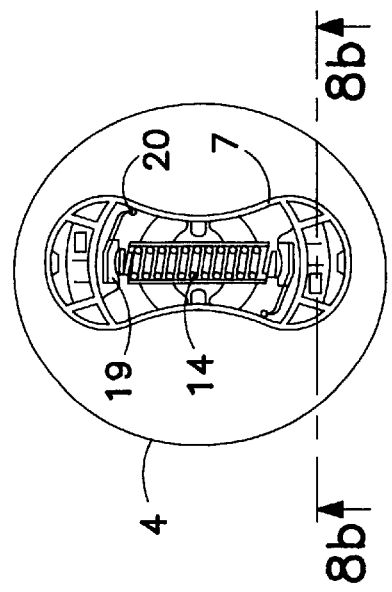

In the assembled state the lower ends of the tabs 15 engage into ramps 18 which are formed on the upper side of the driving ring 3 and have radially inwardly directed ramp guiding surfaces which lead radially inward in the circumferential direction (FIG. 6). During assembly the downwardly protruding tabs 15 of the gripping part 4 are aligned with the ramps 18 and, with slight compression of the compression spring 14, are introduced between the opposite ramps 18 until the circumferential skirt 6 of the gripping part 4 latches with a snap-in fit over the circumferential edge 9 of the basket 2. This inoperative position is shown in FIGS. 8a, b.

The circumferential ends of the ramps 18 are provided with end stops 19, 20. In the inoperative position (FIG. 8a, b) the tabs 15 bear against the end stops 19.

Figure 9A:
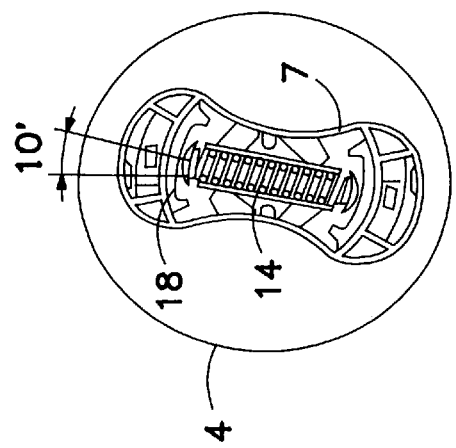
Figure 10A:
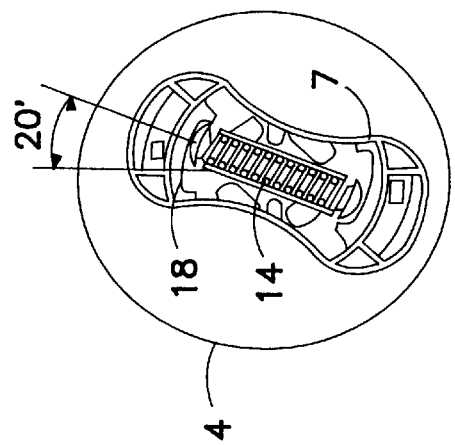

If a "screwing on" torque is applied to the gripping part 4, i.e. a torque in a direction which ensures that the projections 5 of the closure part slide more deeply into the corresponding quarter-turn slots or threaded grooves of the opening to be closed, of the filler neck or the like, and which direction points from the first stops 19 to the second stops 20, the gripping part 4 rotates relative to the closure part 2, 3, as a function of the torque applied with the compression spring 14 increasingly being compressed by the ramps 18, via the intermediate position shown in FIG. 9a, b as far as the end position shown in FIG. 10a, b in which the tabs 15 bear against the end stops 20.

The arrangement described here makes possible an acoustical indication of a predetermined torque limiting value being exceeded within the range of torque which is predetermined by the angle of rotation predetermined by the end stops 19, 20 and the force of the compression spring 4.

The device for the acoustical indication of the torque being exceeded comprises a resilient tongue 21 which protrudes on the lower side of the gripping part 4 and interacts with a snap-in bead 22 and a stop 23 which are formed on the upper side of the driving ring 3. In the inoperative position (FIG. 8a, b) the end of the tongue 21 is situated in front of the snap-in bead 22 in the circumferential direction. In the intermediate position shown in FIG. 9a, b the tongue 21 is just passing the snap-in bead 22, the tongue being deflected and thereby being tensioned. After passing the snap-in bead 22 the tongue springs back into its starting position and simultaneously strikes against the stop 23 (FIG. 10a, b). If the grip 7 of the gripping part 4 is released, the compression spring 14 returns again into its starting position (FIG. 8a, b), the tongue 21 passing the snap-in bead 22 in the reverse direction.

The relative angle of rotation between the gripping part 4 and closure part 2, 3 can be selected as desired between a minimum value of a few degrees (due to production engineering) and 360°. In the embodiment shown the angle between the end stops 19 and 20 is approximately 20°.

A single arrangement comprising the tongue 21 and snap-in bead/stop 22, 23 can be provided, or else a plurality of such arrangements distributed over the circumference. The tongue 21 may alternatively be arranged on the closure part 2, 3 and the snap-in bead 22 and the stop 23 on the gripping part 4. It is also possible for the stop 23 to be arranged on the same side as the tongue 21. For manufacturing reasons it is also conceivable to provide the driving ring with a snap-in bead 22 and a stop 23 symmetrically on both sides whereas only a single tongue 21 is provided on the gripping part 4. Instead of the alignment shown in a circumferential plane 8, the sequence of tongue 21, snap-in bead 22 and stop 23 may alternatively be aligned in a radial plane.

Instead of the diametrical compression spring 14 shown, it is possible for any other spring means to be provided, for example, tensile springs in the circumferential direction, a torsion spring etc., as long as they render the extent of the relative rotation between the gripping part 4 and closure part 2, 3 dependent on the torque applied.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A closure cap, which can be secured in a sealing manner on an opening, for example a filler neck, by means of a rotational movement, for the acoustical indication of a predetermined torque being exceeded during securing, comprising:

a closure part which can be secured in a sealing manner on the opening; and a gripping part for applying the torque, the gripping part comprises:

a rotational connection between the closure part (2, 3) and gripping part (4), which connection permits relative in rotation between said two parts;

spring means (14) which act between the closure part (2, 3) and gripping part (4) in the direction of the relative rotation and subject the extent of the relative rotation to the torque applied; and at least one arrangement comprising a resilient tongue (21) and snap-in bead (22), one part of the arrangement being arranged on the gripping part (4) and the other part being arranged on the closure part (2, 3), and at one point during the relative rotation the tongue (21), by being temporarily deflected, passing the snap-in bead (22).

2. The closure cap as claimed in claim 1, wherein the rotational connection (10) is formed by a sliding fit between a circumferential skirt (8) of the gripping part (4) and a circumferential edge (9) of the closure part (2, 3), which edge is overlapped by said skirt.

3. The closure cap as claimed in claim 1, wherein the closure part (2, 3) has a basket (2) which can be inserted into the opening and is intended to hold a valve capsule or the like, and a driving ring (3) which can be secured on an edge (13) of the basket and fastens the valve capsule in place.

4. The closure cap as claimed in claim 1, which further comprises a stop (23) which is arranged on one of the gripping part (4) and closure part (2, 3) and against which the tongue (21) strikes after passing the snap-in bead (22).

5. The closure cap as claimed in claim 4, wherein the spring means (14) are formed by a compression spring which is arranged in the gripping part (4) diametrically between two moveable tabs (15) which slide during the relative rotation on radially inwardly leading ramps (18) of the closure part (2, 3).

6. The closure cap as claimed in claim 1, wherein the spring means (14) are formed by a compression spring which is arranged in the gripping part (4) diametrically between two moveable tabs (15) which slide during the relative rotation on radially inwardly leading ramps (18) of the closure part (2, 3).

7. The closure cap as claimed in claim 6, wherein the ramps (18) are provided with end stops (19, 20).

8. The closure cap as claimed in claim 7, wherein the snap-in bead (22), the stop (23) and the ramps (18) are formed on the upper side of the driving ring (3), and the tongue (21) is formed on the lower side of the gripping part (4).

* * * * *